(12) United States Patent
Mailer

(10) Patent No.: US 7,460,942 B2
(45) Date of Patent: Dec. 2, 2008

(54) SOIL CULTIVATION IMPLEMENT CONTROL APPARATUS AND METHOD

(75) Inventor: Robert Lindsay Mailer, West End (AU)

(73) Assignee: Hemisphere GPS LLC, Calgary, Alberta (CA)

( * ) Notice: Subject to any disclaimer, the term of this patent is extended or adjusted under 35 U.S.C. 154(b) by 0 days.

(21) Appl. No.: 11/634,555

(22) Filed: Dec. 6, 2006

(65) Prior Publication Data

US 2007/0088482 A1 Apr. 19, 2007

Related U.S. Application Data

(63) Continuation of application No. 10/474,643, filed as application No. PCT/AU02/00451 on Apr. 9, 2002.

(30) Foreign Application Priority Data

Apr. 9, 2001 (AU) .................................... PR4303

(51) Int. Cl.
*G06F 19/00* (2006.01)
(52) U.S. Cl. .................... 701/50; 701/213; 342/357.02; 342/357.08
(58) Field of Classification Search .................. 701/26, 701/50, 213, 210, 205, 207, 23; 342/357.02, 342/357.01, 357.06, 357.08
See application file for complete search history.

(56) References Cited

U.S. PATENT DOCUMENTS

| | | | |
|---|---|---|---|
| 4,466,054 | A | 8/1984 | Shigemasa et al. |
| 5,159,660 | A | 10/1992 | Lu et al. |
| 5,941,317 | A | 8/1999 | Mansur |
| 5,961,573 | A | 10/1999 | Hale et al. |
| 6,041,870 | A | 3/2000 | Zimmerman et al. |
| 6,070,673 | A | 6/2000 | Wendte |
| 6,073,070 | A | 6/2000 | Diekhans |

(Continued)

FOREIGN PATENT DOCUMENTS

AU 30131/95 B 4/1996

(Continued)

*Primary Examiner*—Khoi H. Tran
*Assistant Examiner*—Ronnie Mancho
(74) *Attorney, Agent, or Firm*—Mark E. Brown

(57) ABSTRACT

A soil cultivating apparatus including a tractor towing a row cultivator by means of a three-point linkage. The row cultivator includes a fixed portion and a moveable portion having soil scarifying tools. The movable portion is laterally moveable relative to the fixed portion by means of linkages and is effected by a hydraulic actuator under control of tool bar control systems which is able to determine the position of the moveable portion relative to the fixed portion by means of a sensor. Mounted upon the moveable potion is a DGPS antenna GPS receiver that forms part of the control system. The control system has a microprocessor which operatively executes a stored program. The microprocessor receives data from an intra-rig sensor and from the GPS receiver specifying the absolute coordinate of the movable portion relative to the earth. On the basis of the data received and in accordance with the instructions in the program, the microprocessor generates a series of lateral motion commands which controls the hydraulic actuator. An operator of the system may enter coordinates defining a desired line of the movable portion by means of a data entry device. Command prompts and other feedback to the operator are displayed by means of a screen.

7 Claims, 4 Drawing Sheets

U.S. PATENT DOCUMENTS

| | | |
|---|---|---|
| 6,434,462 B1 | 8/2002 | Bevly et al. |
| 6,804,587 B1 * | 10/2004 | O Connor et al. ............. 701/26 |
| 6,865,465 B2 | 3/2005 | McClure |
| 6,880,643 B1 | 4/2005 | Zimmerman et al. |
| 7,054,731 B1 * | 5/2006 | Lange et al. ................... 701/50 |

FOREIGN PATENT DOCUMENTS

| | | |
|---|---|---|
| WO | PCT/AU99/00930 | 5/2000 |

* cited by examiner

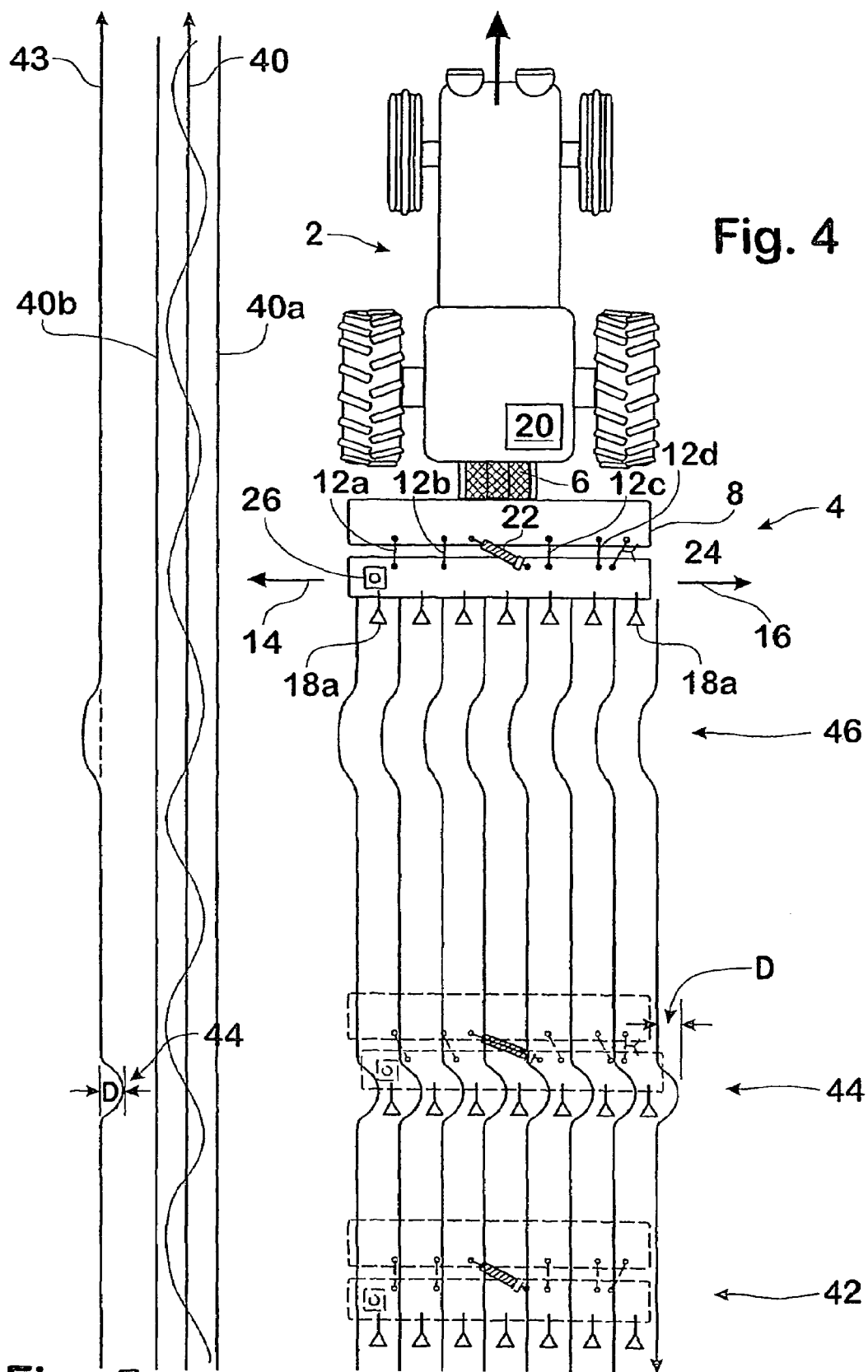

SOIL CULTIVATION IMPLEMENT CONTROL APPARATUS AND METHOD

CROSS-REFERENCE TO RELATED APPLICATIONS

This patent application is a continuation of copending U.S. patent application Ser. No. 10/474,643 filed Oct. 9, 2003.

FIELD OF THE INVENTION

This invention relates to a soil-cultivation apparatus and control apparatus and method therefore.

BACKGROUND

Cultivation of some types of crop, for example cotton, may be performed in cultivation rows that essentially follow the contours of the land. When tilling between planting this is desirably performed by reshaping of cultivation rows rather then by generating an entirely new series of rows.

In the past attempts have been made to provide an apparatus which facilitates reshaping of cultivation rows. For example, in U.S. Pat. No. 5,941,317 to Mansur there is described a row cultivator including a fixed toolbar and a trailing moveable toolbar. Lateral displacement of the moveable toolbar relative to the fixed toolbar is facilitated by an actuator. A pair of mechanical sensors located on opposing ends of the trailing toolbar each determine the position of adjacent, pre-existing, furors. A mechanical apparatus is responsive to the sensors and generates a difference signal that is used to control the actuator in order to reduce furrow spacing irregularities as the row cultivator is passed over the pre-existing furrows.

A problem with the prior art approach to reshaping the furrows is that the reshaping is partly a function of the position of the pre-existing furrows. Accordingly a calibration error in the apparatus may cause error to accumulate so that over a number of seasons the re-shaped furrows become more, rather then less, irregular.

In addition, the practical limits imposed by wheelbase, steering scrub, towing pull and traction of the propulsion unit will necessarily limit the precision at which the cultivator may track the desired cultivation path.

SUMMARY OF THE INVENTION

According to a first aspect of the invention there is provided a soil cultivation apparatus including:
  a fixed portion associated with propulsion means and guidable thereby substantially along a selected cultivation path;
  a cultivator portion linked to said fixed portion;
  an actuator operable between said fixed portion and said cultivator portion for effecting lateral displacement therebetween;
  a position detector selected to provide position data for said cultivator portion;
  a processor having data corresponding to said selected cultivation path and adapted to utilize said position data to generate a control signal for said actuator to effect corrected tracking of the cultivator portion along said cultivation path.

The fixed portion may be adapted to mount to the toolbar of a conventional tractor or the like. Alternatively, the fixed portion may comprise a part of a dedicated propulsion unit for the apparatus.

The fixed portion may be substantially guided along the cultivation path by any suitable means. For example, the fixed portion may be manually guided by steering the fixed portion along the previous-crop's rows to approximate the desired path. Alternatively, the fixed portion may be substantially guided along the path by steering actuators responsive to a control signal that references the desired cultivation path and the position of the fixed portion. The control signal may be generated by the same or different processor means as the cultivator portion, and may obtain position data from the same or different position indicator.

The position indicator may be associated directly with the cultivator portion or may be associated with the propulsion unit or fixed portion. For example, the position indicator may comprise a receiving element of a positioning system. Where the position indicator is associated with the propulsion unit or fixed portion, there is provided offset data means adapted to provide relative position data by which the processor may generate an accurate cultivator position fix from the positioning data generated by the position indicator.

The position detector may include a Differential GPS receiver adapted to accept position data from the satellite constellation, corrected locally by a further correction signal from a Differential GPS base station. In the alternative, or in addition, there may be provided a modified-algorithm base station adapted to provide more accurate correction data than commercial DGPS signals, and in this case the differential data receiver may also be modified.

Preferably the position detector further includes a relative position sensor arranged to generate a signal indicative of the relative position of the moveable portion to the fixed portion, wherein the software product further includes instructions for receiving signals from the relative position sensor. The relative position sensor may be the same or different to the aforementioned offset data means.

The relative position sensor may be arranged to monitor operation of the actuator. Alternatively the relative position sensor may be coupled between the fixed portion and the moveable portion and include a rotary transducer.

In another embodiment the relative position sensor includes a second Differential GPS system including an antenna located at a point stationary with respect to the fixed portion. For example the second antenna may be mounted on the fixed portion or operatively on the agricultural vehicle.

It is preferred that the processor include software include instructions for implementing a second order closed PID loop.

Alternatively the software may include instructions for implementing a bang-bang control algorithm.

According to a further aspect of the present invention there is provided a control system for a soil cultivation implement of the type including a fixed portion for towing behind an agricultural vehicle and a moveable portion laterally offsettable from the fixed portion, the cultivation implement including an actuator for effecting lateral offset of the moveable portion, the control system including:
  position detector means for generating signals indicative of the global position of the moveable portion; and
  a processor operatively executing a software product including instructions for receiving the signals from the position detector means and generating a control signal for minimising divergence of the moveable portion from a globally desired path.

In a preferred embodiment the control system further includes a relative position detector means arranged to sense the position of the moveable portion relative to the fixed portion.

Preferably the relative position detector means includes position detector means of the fixed portion.

Alternatively the first absolute position sensor may determine the position of the fixed portion.

In a further embodiment the position detector means comprises the first absolute position sensor and a second absolute position sensor.

Preferably the relative position sensor is arranged to determine lateral offset of the movable portion relative to the fixed portion.

Alternatively the relative position sensor may be arranged to monitor operation of the actuator.

According to another aspect of the present invention there is provided a method for controlling a soil cultivation implement of the type including a fixed portion for towing behind an agricultural vehicle and a moveable portion laterally offsettable from the fixed portion, the method including the steps of:

towing the implement behind an agricultural vehicle;
monitoring the global position of the moveable portion;
comparing said global position to a predetermined globally specified desired path; and
offsetting the moveable portion relative to the fixed portion in order that the moveable portion tracks the desired path.

Preferably the method includes the further step of monitoring the position of the moveable portion relative to the fixed portion and using said monitored relative position to determine the offset required to track the desired path.

Preferably the step of offsetting the moveable portion includes generating a control signal for controlling an actuator located to effect motion of the moveable portion relative to the fixed portion.

Preferably the control signal is generated by means of a PID algorithm.

BRIEF DESCRIPTION OF THE FIGURES

In order that this invention may be readily understood and put into practical effect, reference will be made to the accompanying drawings wherein:

FIG. 4 is a diagram used to explain the operation of an embodiment of the invention.

FIG. 5 depicts a desired path of travel of a moveable portion of a soil conditioning implement.

DETAILED DESCRIPTION OF PREFERRED EMBODIMENTS

Figure 1:
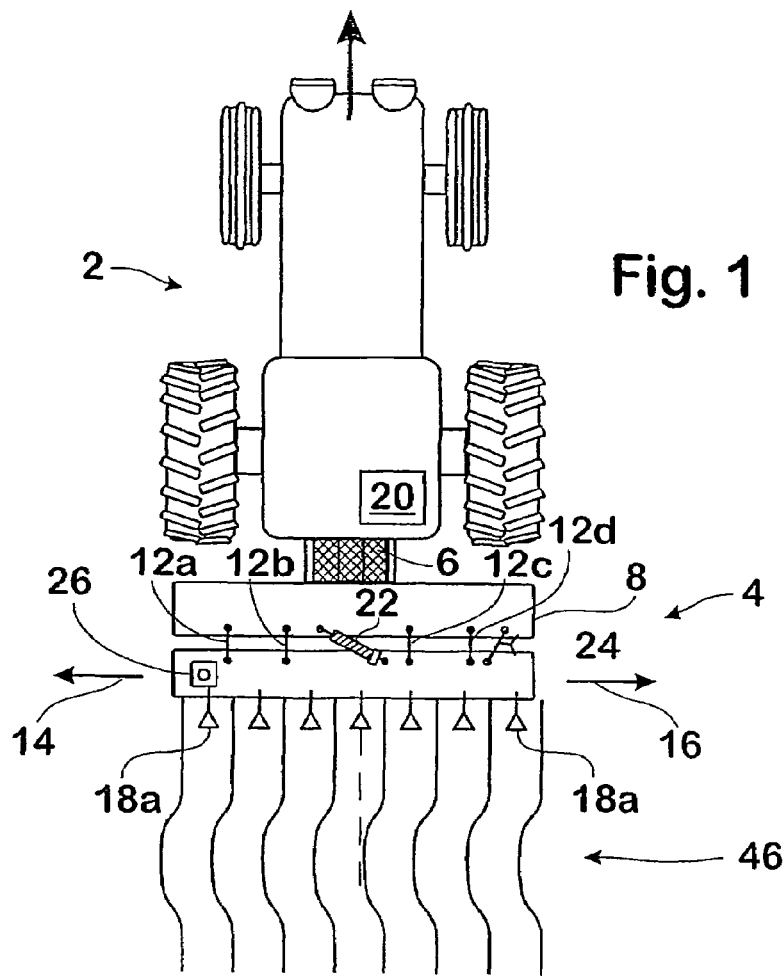
FIG. 1 is a stylised plan view of an agricultural vehicle towing a controllable soil cultivation implement according to the present invention.
Figure 1A:
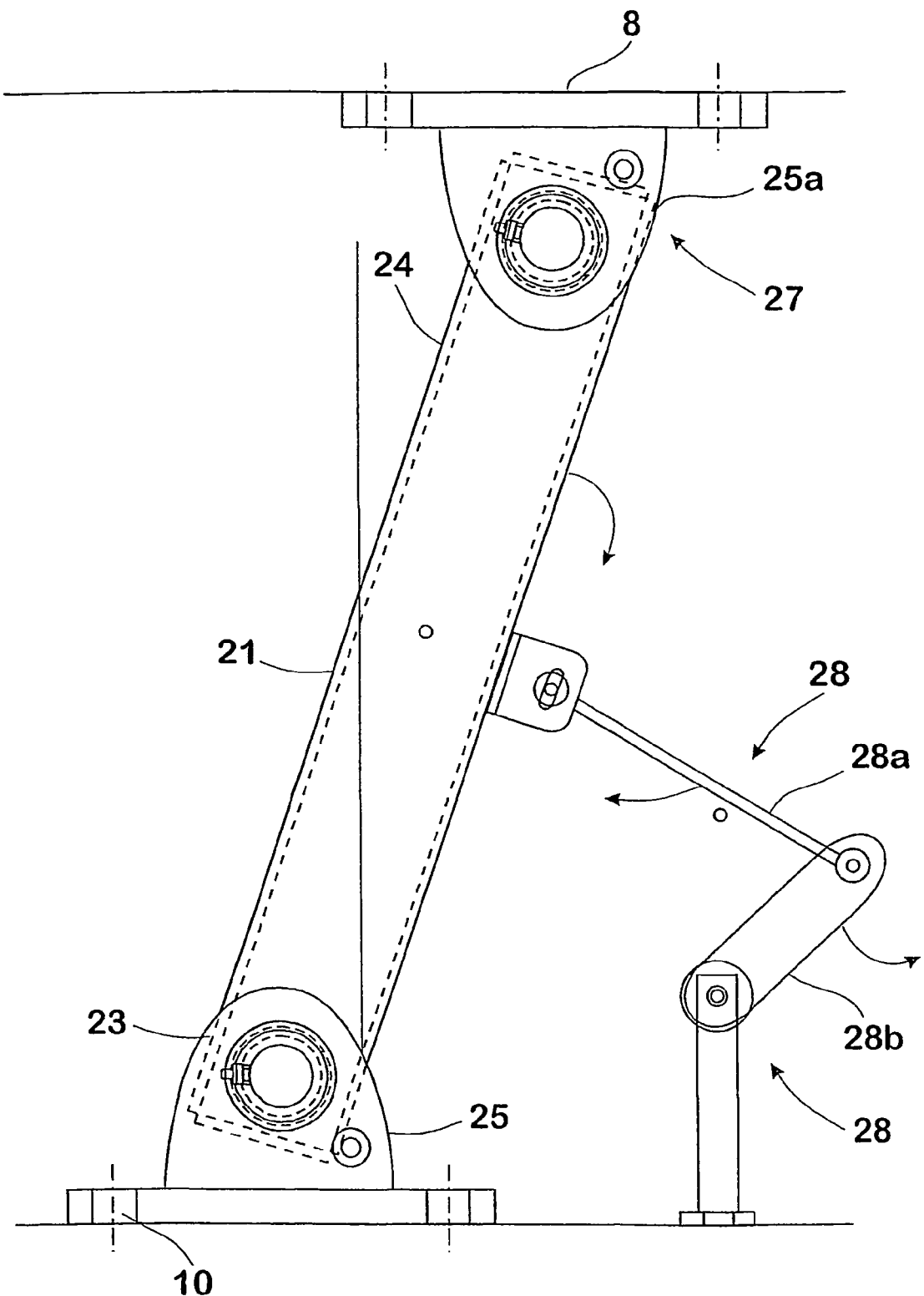
FIG. 1A is a close up of a portion of FIG. 1 showing a relative position sensor.

With reference to FIG. 1 there is depicted a stylised plan view of a tractor 2 towing a soil conditioning implement in the form of row-cultivator 4. Row-cultivator 4 is attached to tractor 2 by means of a three-point linkage 6. The row-cultivator includes a fixed portion 8 and a moveable portion 10. Attached to the moveable portion are a number of soil scarifying tools 18a-18n. The movable portion is able to be laterally off set relative to the fixed tool bar by means of pivotally connected linkages. Left and right lateral offset of moveable portion 10 relative to fixed portion 8 is indicated by arrows 14 and 16. Lateral offset of the moveable tool bar is effected by hydraulic actuator 22 under control of tool-bar control system 20. Tool bar control system 20 is able to determine the position of the moveable tool-bar relative to the fixed tool-bar by means of sensor 24. A close-up view of sensor 24 is shown in FIG. 1A.

The relative position sensor 24 includes a primary connection member 21 having a first end 23 rotably attached to the moveable portion 10 via a first anchor member 25. Similarly, the second end 27 is rotably attached to the fixed portion 8, via a second anchor member 25a.

A secondary connection member 28, having a double arm 28a-28b arrangement is rotably attached to the mid point of the primary connection member 21 and fixedly attached to the moveable portion.

A rotary transducer 29 detects lateral offset of the moveable portion 10 relative to the fixed portion 8, via the arms 28a-28b of the secondary connection member. The displacement is converted to an electrical signal by the rotary transducer, which is communicated to the analog to digital converter Mounted upon the moveable portion 10 is a differential geographical positioning system (DGPS) antenna means 26. The output from the GPS antenna means is coupled to a DGPS receiver that forms part of the tool bar control system 20. The differential DGPS receiver is able to calculate the current longitude, latitude and altitude of the DGPS antenna from the output of the DGPS antenna. The antenna means is communicatively coupled with a plurality of satellites (not shown) which provide the necessary signals to the antenna means, that are used by the receiver in calculating the current longitude, latitude and altitude.

The differential GPS system works in co-operation with a differential GPS base station (not shown). The base station is situated at a known latitude, longitude, altitude position and receives signals from the same satellite as the DGPS antenna 26. The base station compares the position determined from the received signal to its known position, and calculates an error signal indicative of the difference between the two valves. The error signal is communicated to the DGPS receiver 36 for correction of the positional data received from the differential DGPS antenna 26.

Differential DGPS base stations are available from a number of manufacturers. The applicant has found the best results to be obtained from its own differential GPS base station.

Figure 2:
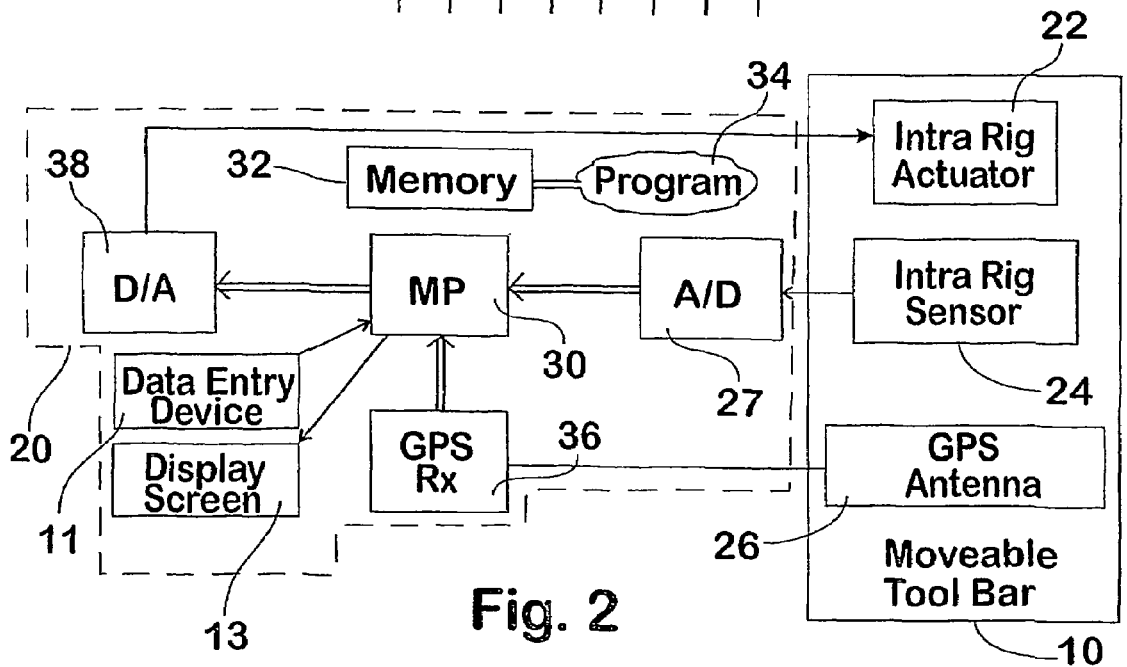
FIG. 2 is a block diagram of a control system according to an embodiment of the invention.

FIG. 2 is a block diagram of tool bar control system 20. System 20 is built around microprocessor 30 which operatively executes a program 34 stored in system memory 32. Microprocessor 30 receives data from intra-rig sensor 24 via analog-to-digital converter 27. The microprocessor also receives data from GPS receiver 36. GPS receiver 36 receives an RF signal from GPS antenna 26 mounted on movable tool-bar 10. The GPS receiver 36 generates a stream of data specifying the absolute coordinate of the movable tool-bar relative to the earth. On the basis of the data received from A/D converter 27 and GPS receiver 36, and in accordance with the instructions in program 34, the microprocessor generates a series of lateral motion commands which are converted to analog form by D/A converter 38. The output signal from D/A converter 38 controls intra-rig actuator 22. Intra-rig actuator 22 typically consists of a hydraulic cylinder under solenoid control with the control input of the solenoid coupled to D/A converter 38.

An operator of the system 20 may enter coordinates defining a desired line of travel of the movable portion by means of data entry device 11. The line of travel can be a representation of a set of longitude-latitude pairs along which the desired line of travel lies. Command prompts and other feedback to the operator are displayed by means of screen 13.

Figure 3:
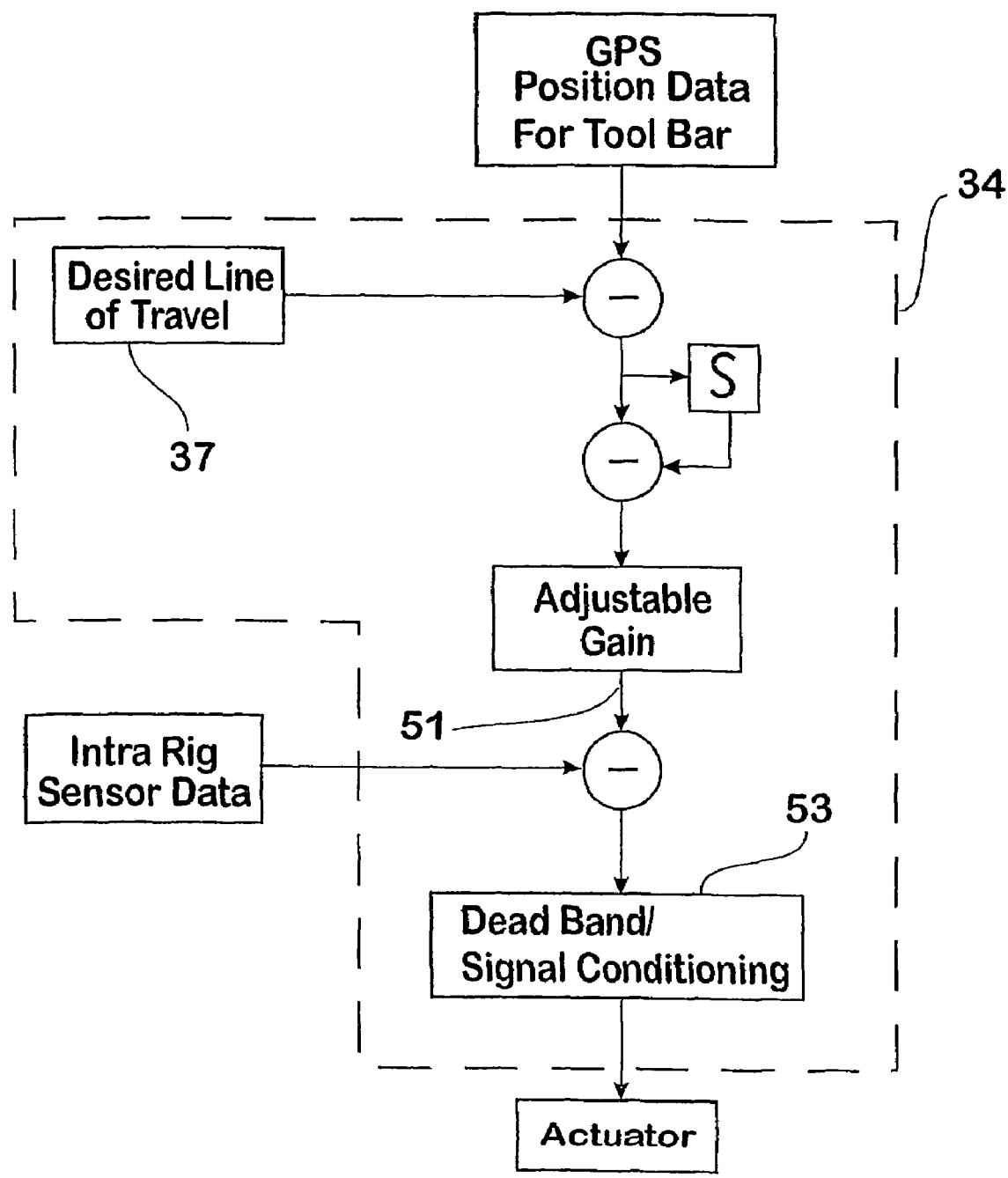
FIG. 3 is a block diagram of a dual loop PID control system implemented by a software product as used in the present invention.

With reference to FIG. 3 there is depicted a diagram of the control system implemented by program 34. Program 34 makes use of the movement provided by the intra-rig actuator to minimise the error between a point on a desired line of travel and the current position as measured by the GPS system.

The program implements a pair of cascaded parallel PID control loops with the output 51 for the first loop corresponding to the PID conditioned across track error of the movable toolbar relative to a point on the desired line of travel. This valve is then used as the input to the second loop. The across track error calculated by the first loop is conditioned to minimise the effect of noise present in the signal delivered from the GPS antenna 26. The PID algorithm operates as a closed loop in that any lateral offset effected by the intra-rig actuator will result in updated GPS data for the moveable portion. This data is then input for the first loop.

PID (proportional, integral, derivative) controllers use a number of techniques to generate an output that cause a specified corrective effort to be applied to a process, so as to drive a measurable process variable towards a desired value, known as the set point. The aim of the applied corrective effort is to eliminate the error between the measured process variable and the setpoint. Various PID algorithms used to calculate the quantities that represent the corrective effort are known in the art, and a full discussion of those algorithms is not necessary to fully describe the present invention. Indeed, the present invention is independent of the particular PID algorithm that is used to calculate the lateral motion commands communicated to the intra-rig actuator 22.

The across track error is the perpendicular distance along the surface of the earth to the current position of the moveable portion 10 from a point on the desired line of travel. The across track error is the shortest distance from the desired line of travel to a reference point or "control position" on the movable tool-bar. Typically the reference point will coincide with the location of antenna 26.

The process variable of the first loop is the actual across track error as determined by the desired line of travel and the current absolute global position given by the GPS receiver 36.

The output 51, of the first loop is used as the setpoint of the second loop. An adjustable gain may be applied to the output of the first loop to match the amplitudes of the signal from the relative position sensor. Intra-rig displacement is used as the process variable of the second control loop. An adjustable dead band is applied to the output of the second loop before it is delivered to the actuator. Therefore the output of the second loop is limited in its response to prevent excessive activation of the intra-rig actuator.

It will be noted that program 34 includes a program module 36 generating data defining a desired line of travel for movable tool bar 10. The desired line of travel data may be predetermined. Alternatively the desired line of travel may be manually entered by an operator of tractor 2 while the tractor is in motion. The desired line of travel may consist of a series of points along which a reference point, for example the midpoint, of moveable tool bar 10 is to travel.

An example of the operation of the invention will now be described with reference to FIGS. 4 and 5. In the example given the tractor follows a path 40 which typically is represented as an idealized smooth curve The path followed by the tractor will in practice vary from the desired line because of local conditions. To minimise this error, the tractor itself may operate under the control of a vehicle guidance system which may also make use of a differential GPS system. The use of such a system will enable the tractor to stay within a desired band of error 40a, 40b along the desired path 40. This is further detailed below.

The desired path of a reference point on moveable tool-bar 10 is shown by line 43. It will be noted that the desired path of the tool-bar diverges from the straight line path twice. Initially at position 42 there is zero lateral offset between moveable portion 10 and the fixed portion 8. When the moveable portion 10 reaches position 44 it is desired that the moveable portion 10 be offset from the fixed tool bar 8 by a distance D in the indicated direction.

As tractor 2 proceeds along its path system 20 compares GPS data from receiver 36 to desired path information stored in memory 32. Divergence of the position of movable tool bar 10 from the desired point data is detected by the dual loop control algorithm implemented by program 34. Microprocessor 30, in accordance with the program generates control signals in order to cause intra-rig actuator 22 to laterally offset moveable tool bar 10 so that the desired path is tracked with little cross track error. Consequently at position 44 moveable tool bar 10 is laterally offset a distance D as is desired.

The apparatus of FIG. 1 might also be operated by firstly defining a desired line of travel or "wayline" in memory 32. For example the wayline might be defined by first driving the tractor 2 to a position which will be a first way point for defining a wayline. Once at the way point the current global position can be downloaded, for example by a DGPS antenna with a correctional signal from a DGPS base station. The tractor 2 may then be driven to a second way point, with the global position of the second way point also being downloaded. The direction vector between the way points is called the wayline.

Further details of this process are given in the applicants published international patent application number PCT/AU99/00930.

The vehicle is then driven manually by an operator on an approximately parallel path to that of the wayline. Once the operator is satisfied that the vehicle is travelling with an appropriate perpendicular offset to the wayline, the operator issues a command to the control system to continue travelling with the selected offset.

The above steps can then be repeated each time a new wayline is to be traveled.

The purpose of the above operational mode is to facilitate the vehicle travelling at an offset to the position of the desired wayline at which the effects of the implement are to be made.

It will be understood that tractor 2 may take another path other than a straight-line path such as path 40.

Variations to the apparatus described with reference to FIGS. 1 and 2 are also possible. For example, in one embodiment intra-rig sensor 24 may be omitted. In that case program 34 implements a bang-bang control system that moves the antenna and the moveable toolbar to minimise offset from the desired line of travel.

In order for the embodiment of the invention described with reference to FIG. 1 to function effectively, the combination of actuator force and field conditions must be such that the bandwidth of the actuation is less than half that of the rate at which coordinate updates are received from the GPS system.

A further variation is to fit the actuator with an intra-rig displacement observer.

In that case program 34 will include instructions to mathematically integrate output from the intra-rig displacement observer in order to enable the estimation of rig position without the presence of a separate intra-rig sensor 24. Calibration of the intra-rig actuator position is regularly required to ensure that control positions are not outside the physical limitations of the tool bar being controlled.

In another variation the intra-rig sensor is replaced by using a further GPS system including a second GPS antenna mounted on the tractor 2 or on the fixed toolbar 8. This arrangement assumes that the toolbar is towed directly behind the tractor and that lateral offset of the moveable towbar may be determined by a comparison performed in software of the data from the first and second GPS receiver.

It will be realised by those skilled in the art that preferred embodiments of the present invention are an advance over soil cultivation implements found in the prior art. Specifically, prior art implements provide for lateral displacement of the moveable portion where an irregularity in the spacing of existing mounds and furrows is sensed by a mechanical probe. This type of sensing means operates by monitoring the spacing between the probes and a defined reference position located on the cultivator.

In contrast, the present inventions use of the global position of the cultivator relative to a predefined path of travel, results in an actual path of travel more closely reflecting the desired path of travel. Further, the use of a reference position independent of a position on the cultivator ameliorates the accumulation of calibration errors as occurred in the prior art.

It will of course be realised that the above has been given only by way of illustrative example of the invention and that all such modifications and variations thereto as would be apparent to persons skilled in the art are deemed to fall within the broad scope and ambit of the invention as is defined in the appended claims.

The invention claimed is:

1. A control system configured to control a position of a working portion of an agricultural implement, said agricultural implement having a first portion and a second portion, wherein the implement is attached to a vehicle and the working portion is connected to the second portion, the working portion and the second portion of the implement being moveable relative to the first portion, the control system comprising:
   a first GNSS system configured to determine a global position of the working portion of the implement and including an antenna mounted thereon and a receiver receiving GNSS positioning signals from the antenna;
   a processor configured to compare the global position of the working portion of the implement with a desired global position of the working portion;
   the processor configured to determine the desired global position of the working portion of the implement by accessing way line data corresponding to a desired path of travel for the working portion of the implement;
   the processor configured to generate a control signal in response to the comparison between the global position of the working portion of the implement and the desired global position of the working portion of the implement, said control signal configured to cause movement of the working portion of the implement relative to the first portion to thereby move the working portion towards the desired path of travel;
   a second GNSS system configured to determine a global position of the first portion or the vehicle;
   the implement further including an actuator situated between said first and second portions and configured to cause relative movement between the implement first and second portions; and
   the control signal configured to cause actuation of the actuator to effect relative movement between the implement first and working portions in response to said control signal.

2. The control system as claimed in claim 1 wherein the first portion comprises a part of the vehicle.

3. The control system as claimed in claim 1 wherein the first portion comprises a mounting portion for mounting to a toolbar of the vehicle, the vehicle being a tow vehicle.

4. The control system as claimed in claim 1 wherein the first portion is attached to a three point hitch of the vehicle, the vehicle being a tow vehicle.

5. The control system as claimed in claim 1 wherein the first and second GNSS systems comprise differential GPS systems.

6. The control system as claimed in claim 1 further comprising a data entry device adapted for entry of way-line data into the processor.

7. An agricultural implement having a first portion and a second portion, wherein the implement is attached to a vehicle and a working portion is connected to the second portion, the working portion and the second portion of the implement being moveable relative to the first portion, the apparatus further comprising:
   a first GNSS system configured to determine a global position of the working portion of the implement and including an antenna mounted thereon and a receiver receiving GNSS positioning signals from the antenna;
   a processor configured to compare the global position of the working portion of the implement with a desired global position of the working portion;
   the processor configured to determine the desired global position of the working portion of the implement by accessing way line data corresponding to a desired path of travel for the working portion of the implement;
   the processor configured to generate a control signal in response to the comparison between the global position of the working portion of the implement and the desired global position of the working portion of the implement, said control signal configured to cause movement of the working portion of the implement relative to the first portion to thereby move the working portion towards the desired path of travel;
   a second GNSS system configured to determine a global position of the first portion or the vehicle; the implement further including an actuator situated between said first and second portions and configured to cause relative movement between the implement first and second portions; and
   the control signal configured to cause actuation of the actuator to effect relative movement between the implement first and working portions in response to said control signal.

* * * * *